US010601860B2

(12) United States Patent
Mihan et al.

(10) Patent No.: US 10,601,860 B2
(45) Date of Patent: Mar. 24, 2020

(54) APPLICATION PLATFORM SECURITY ENFORCEMENT IN CROSS DEVICE AND OWNERSHIP STRUCTURES

(71) Applicant: THE TORONTO-DOMINION BANK, Toronto (CA)

(72) Inventors: Koko Mihan, Toronto (CA); Dino D'Agostino, Toronto (CA); Paul Mon-Wah Chan, Markham (CA); John Jong-Suk Lee, Toronto (CA); Paul Milkman, Toronto (CA); Satwinder Singh Brar, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 63 days.

(21) Appl. No.: 15/455,690

(22) Filed: Mar. 10, 2017

(65) Prior Publication Data
US 2017/0264635 A1   Sep. 14, 2017

Related U.S. Application Data

(60) Provisional application No. 62/306,897, filed on Mar. 11, 2016.

(51) Int. Cl.
*G06F 21/00*   (2013.01)
*H04L 29/06*   (2006.01)
(Continued)

(52) U.S. Cl.
CPC ........ *H04L 63/1441* (2013.01); *G06F 21/554* (2013.01); *G06F 21/577* (2013.01);
(Continued)

(58) Field of Classification Search
CPC combination set(s) only.
See application file for complete search history.

(56) References Cited

U.S. PATENT DOCUMENTS

| 8,347,386 B2 | 1/2013 | Mahaffey et al. |
| 8,839,431 B2 | 9/2014 | Bennett |

(Continued)

OTHER PUBLICATIONS

Assaf Regev, Securing Mobile Banking Apps: You Are Only as Strong as Your Weakest Link, Article, Jan. 26, 2015, 10 Pages.
(Continued)

*Primary Examiner* — Lisa C Lewis

(57) ABSTRACT

Methods and systems provide application platform security enforcement. A distributed system communicates between a plurality of remote devices and at least one secured server to facility providing a secured service. The distributed system may comprise a remote communication server and one or more security layer components where the plurality of remote devices connect through ones of the security layer components. Upon detection of a security breach by a first remote device, the distributed system determines potential devices at risk from the plurality of remote devices, analyzing risk factors for commonalities. A lock down and/or quarantine of the first remote device and the devices at risk is instructed. Risk factors may include whether the remote devices communicate via a same security layer component, are geographically proximate; and/or are associated at the user level, for example are proximate users in a social network graph. Reactivation is also provided.

18 Claims, 8 Drawing Sheets

(51) Int. Cl.
*G06F 21/55* (2013.01)
*G06F 21/57* (2013.01)
*H04W 4/21* (2018.01)
*H04W 4/70* (2018.01)
*H04W 12/08* (2009.01)

(52) U.S. Cl.
CPC ...... *H04L 63/1408* (2013.01); *H04L 63/1416* (2013.01); *H04L 63/1425* (2013.01); *H04L 63/1433* (2013.01); *H04L 63/18* (2013.01); *H04L 63/20* (2013.01); *H04W 4/21* (2018.02); *H04W 4/70* (2018.02); *H04W 12/08* (2013.01)

(56) References Cited

U.S. PATENT DOCUMENTS

| | | | | |
|---|---|---|---|---|
| 2003/0140291 A1* | 7/2003 | Brown | ........... | G01R 31/318555 714/724 |
| 2003/0226015 A1* | 12/2003 | Neufeld | ................ | G06F 21/305 713/166 |
| 2004/0219955 A1* | 11/2004 | daCosta | ............ | H04W 52/0229 455/574 |
| 2012/0170473 A1* | 7/2012 | Das | .................. | H04W 36/00837 370/252 |
| 2012/0214494 A1* | 8/2012 | Awoniyi | ................ | H04W 88/10 455/439 |
| 2014/0068048 A1* | 3/2014 | Kind | ................... | H04L 41/0879 709/223 |
| 2014/0237545 A1 | 8/2014 | Mylavarapu et al. | | |
| 2015/0295800 A1* | 10/2015 | Bala | .................... | H04L 67/2819 709/224 |
| 2017/0116103 A1* | 4/2017 | Cencini | ............. | G06F 11/3055 |
| 2018/0343150 A1* | 11/2018 | Vaughn | .................... | F24F 11/63 |

OTHER PUBLICATIONS

Abhijit Bose et al., Behavioral Detection of Malware on Mobile Handsets, Article, Jun. 17-20, 2008, 14 Pages, Breckenridge, Colorado, USA.

* cited by examiner

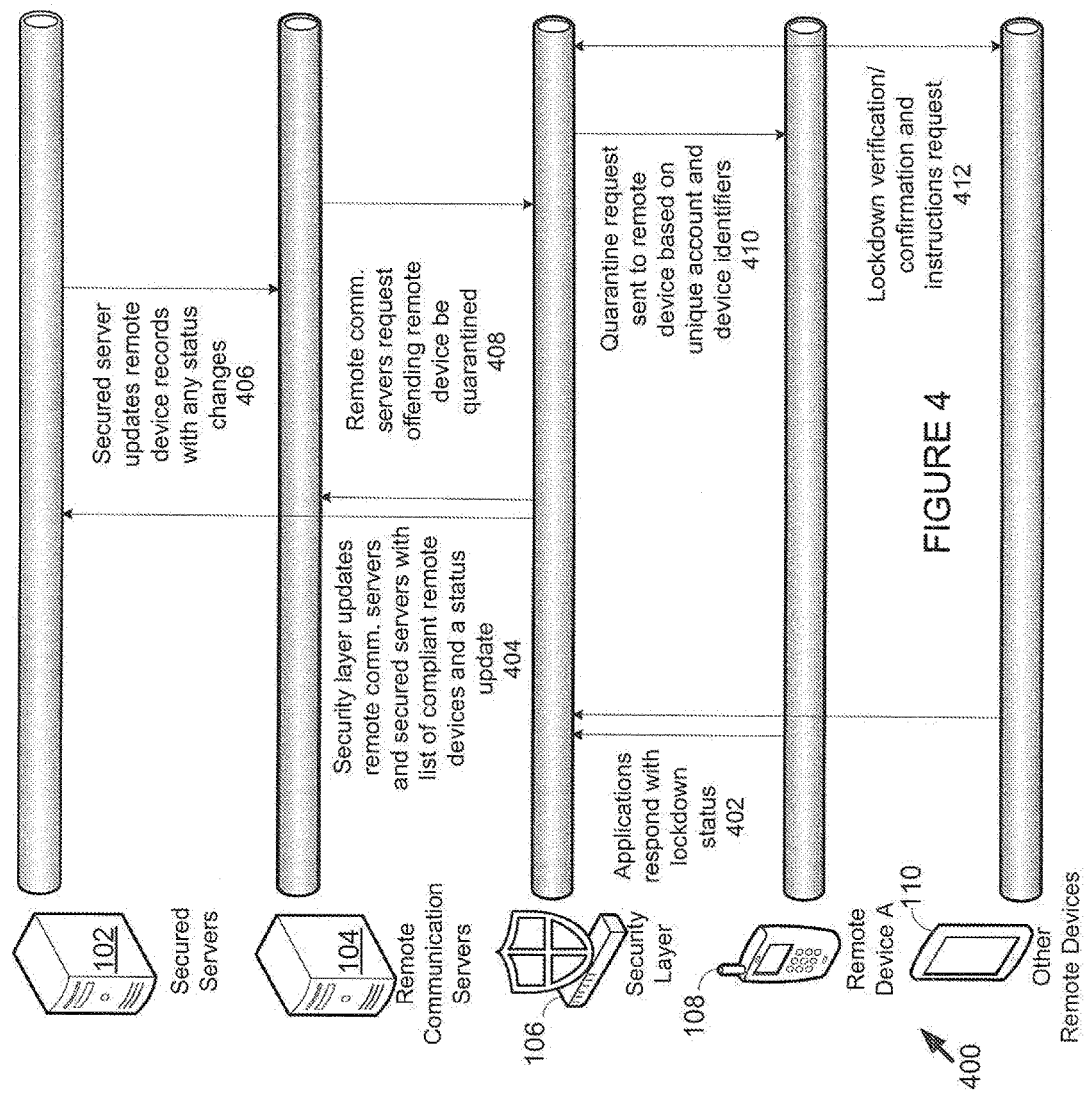

APPLICATION PLATFORM SECURITY ENFORCEMENT IN CROSS DEVICE AND OWNERSHIP STRUCTURES

CROSS-REFERENCE

This application claims the benefit of U.S. Provisional Application No. 62/306,897 filed Mar. 11, 2016, and incorporates the content thereof herein by reference.

TECHNICAL FIELD

The disclosed embodiments generally relate to systems, methods, and apparatuses for application security, application platform security and OTA (over the air) security and more particularly to, platform security enforcement in cross device and ownership structures.

BACKGROUND

The use of applications (including financial applications) that require highly sensitive data on mobile devices is becoming more prevalent in the current mobile environment. Several products exist that can manage mobile platforms and applications running on those platforms. OTA application managers can also be used to enforce IT security policies on mobile devices in the field. OTA management of mobile devices can take the form of policy control of existing devices. Typically, the management of mobile devices is at an individual level or at the ownership level where one or all devices under an IT policy are managed through an OTA manager. The control of these devices is also typically conducted by a manual or scheduled update that may create a potential vulnerability point, which hostile elements may exploit. Systems that are designed to control multiple devices typically limit this control to devices that have a common domain, i.e. same corporate server. Though mobile devices, applications and platforms are mentioned above, it will be understood that other environments (e.g. client-server environments) are similar and require similar management. One example is represented by the Internet of Things (IoT). In the IoT environment, client (or client-like) IoT devices may not be mobile devices, per se.

BRIEF DESCRIPTION OF THE DRAWINGS

FIGS. 3A, 3B and 4 depict shut down and/or quarantine (deactivation) related operations including flows of messages or signals between components of the computing environment of FIG. 1 consistent with the disclosed embodiments.

DESCRIPTION OF THE EMBODIMENTS

Figure 1:
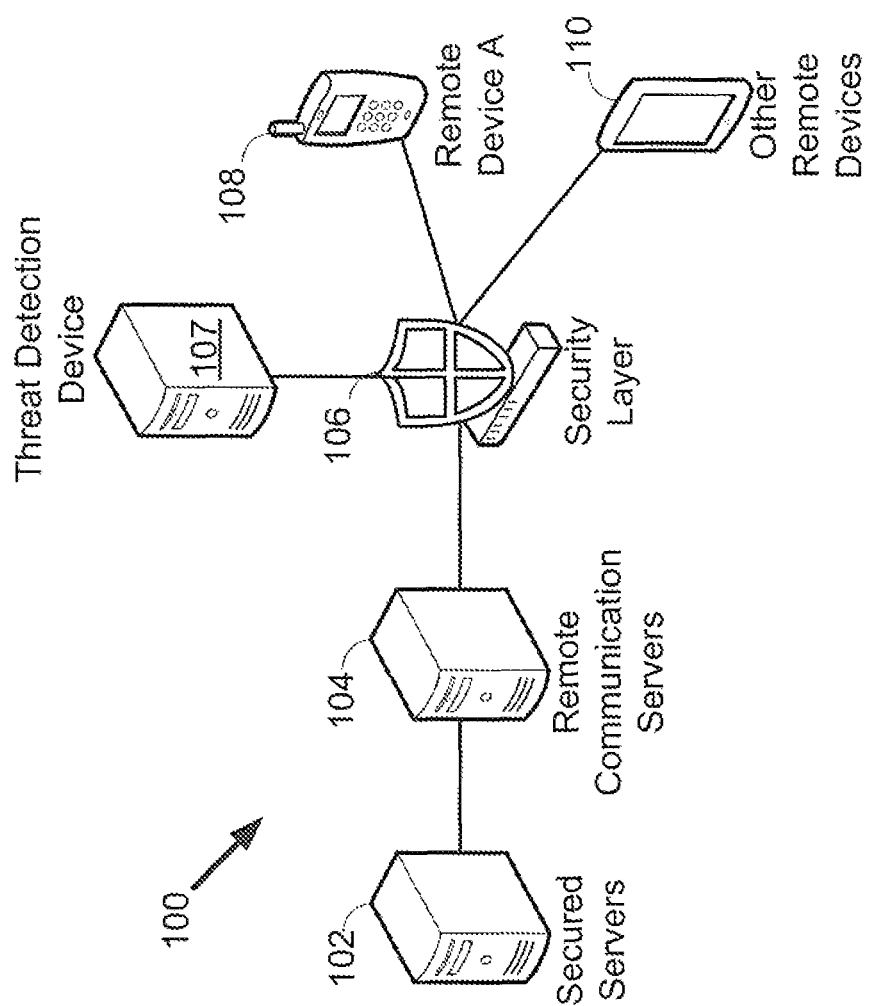
FIG. 1 depicts an exemplary computing environment consistent with disclosed embodiments.

A way of controlling application security, such as mobile application security, is needed that allows for the automatic prevention of the spread of potential hostile elements within the device infrastructure. The disclosed embodiments include systems and methods to provide application security and the automatic propagation of segregation measures to prevent the spread of potential hostile elements within the device infrastructure.

Methods and systems provide application platform security enforcement. A distributed system communicates between a plurality of remote devices, such as mobile devices, and at least one secured server to facilitate providing a secured service. The distributed system may comprise a remote device communication server and a plurality of security layer components where the plurality of remote devices connect through respective ones of the security layer components. Upon detection of a security breach by a first remote device, the distributed system determines potential devices at risk from the plurality of remote devices, analyzing risk factors for commonalities. A lock down of the first remote device and the devices at risk is instructed. Analysis of risk factors examines whether the first remote device and other remote devices communicate via a same security layer component, are geographically proximate; and/or are associated at the user level, for example are proximate users in a social network graph, Reactivation is also described.

There is described a communication server, comprising: a storage device; and at least one processor coupled to the storage device. The storage device stores software instructions to configure the operation of the at least one processor, when executed such that the communication server is operative to: communicate, via one or more communication networks, between at least one secured server and a plurality of remote devices, including a first remote device, to facilitate a secured service to the plurality of remote devices from the at least one secured server, wherein communications between the communication server and the first remote device are communicated through a first security layer component and communications between the communication server and others of the plurality of remote devices are communicated either through the first security layer component or at least one other security layer component; wherein the communications providing the secured service between the secured server and the plurality of remote devices comprise an in-band communication; and following a locking down or quarantining of the first remote device in which in-band communications by the first remote device for the secure service are at least limited: communicate a reactivation message to the first remote device which comprises an out of band communication; and remove the locking down or quarantining of the first remote device in response to a reactivation by the first remote device to permit the first remote device to communicate for the secured service limited by the locking down or quarantining.

The communication server may be operative to determine whether to reactivate the first remote device by evaluating configuration information maintained for the first remote device which indicates the first remote device is configured to communicate for the secured service. The locking down or quarantining of the first remote device may be responsive to a detection of a threat in relation to the first remote device and the configuration information maintained for the first remote device may indicate the first remote device is no longer vulnerable to the threat. The communication server may be operative to communicate to the first remote device an in-band communication comprising a status inquiry message to initiate a response that communicates configuration information from the first remote device. The communication server may be operative to maintain configuration information for the first remote device in accordance with the response.

The reactivation message may be communicated via email, SMS, MMS, instant messenger, voice or other protocol different from a protocol used to communicate in-band communications.

The reactivation message may comprise a secure link, which, when invoked, initiates reactivation of the first remote device to the communication server.

The first security layer component and the communication server may be implemented by a single computing device.

There is described a system for securely communicating a secured service to a plurality of remote communication devices, the system comprising: a plurality of remote communication servers and respective security layer components, each of the remote communication servers comprising: a storage device; and at least one processor coupled to the storage device, the storage device storing software instructions which when executed configures a respective one of the remote communication servers to: communicate, between at least one secured server and some of the plurality of remote devices to facilitate a secured service to the some of the plurality of remote devices via one or more communication networks, wherein communications between the respective one of the remote communication servers and the some of the plurality of remote devices are communicated through the respective security layer component; wherein communications facilitating the secured service comprise in band communications; and following a locking down or quarantining of the first remote device in which in-band communications by the first remote device for the secure service are at least limited: communicate an out-of-band reactivation message to the first remote device via a second communications band; and remove the locking down or quarantining of the first remote device in response to a reactivation by the first remote device to permit the first remote device to communicate for the secured service limited by the locking down or quarantining.

Each remote device of the plurality of remote devices may comprise one of a plurality of N different device types and the plurality of remote communication servers may comprise N remote communication servers each communicating with one of the plurality of N different device types.

Each of the remote communication servers may be configured to determine whether to reactivate a particular remote device by evaluating configuration information maintained for the particular remote device which indicates the particular remote device is configured to communicate for the secured service; and wherein the particular remote device communicates configuration information during a period of the locking down and/or quarantining.

There is described a communication server comprising: a storage device; and at least one processor coupled to the storage device, the storage device storing software instructions for controlling the at least one processor when executed, the at least one processor being operative with the software instructions to: communicate, via, one or more communication networks, between at least one secured server and a plurality of remote devices including a first remote device to facilitate a secured service to the plurality of remote devices from the at least one secured server, wherein communications between the communication server and the first remote device are communicated through a first security layer component and communications between the communication server and others of the plurality of remote devices are communicated through the first security layer component or at least one other security layer component; receive via the first security layer component a communication of a detection of a security breach in association with the first remote device; determine potential remote devices at risk from the others of the plurality of remote devices by identifying common risk factors between the first remote device and the others of the plurality of remote devices; and instruct initiation of a lock down of the first remote device via the first security layer component and instruct initiation of a lock down of the potential remote devices at risk via the first security layer component or at least one other security layer component; and wherein the communication server is coupled for respective communication with the at least one secured server and the plurality of remote devices.

Identifying common risk factors may examine at least one of the following: whether the first remote device and the others of the plurality of remote devices communicate via a same security layer component; whether the first remote device and the others of the plurality of remote devices are geographically proximate; and whether the first remote device and the others of the plurality of remote devices are operated by users who are associated.

The communication server may be configured to determine whether the first remote device and the others of the plurality of remote devices are operated by users who are associated by examining social network data and performing social network graphical analysis to find proximate users. To examine whether the first remote device and the others of the plurality of remote devices are geographically proximate, the communication server may be configured to examine at least one of ping latency, network identification, location services data provided by the remote devices and IP address data.

The communication server may be is configured to: maintain data identifying compliant remote devices permitted to communicate for the secured service; and receive an update to, said compliant remote devices from the first security layer component or at least one other security layer component. The communication server may be configured to initiate a quarantining of the first remote device via the first security layer component.

Determining potential remote devices at risk may comprises evaluating whether the other remote devices and the first remote device have in common software instructions for at least one of: an operating system, an application and/or network protocols to communicate for the secured service; and wherein lock down is responsive to the evaluating.

The first security layer component may be either provided by the communication server or a separate server of a communication system. The communication of the detection of the security breach may be received via the first security layer component from the first remote device.

There is described a communication system comprising one or more communication servers providing at least one remote communication server and at least one security layer component, each communication server comprising a storage device and at least one processor coupled to the storage device, the storage device storing software instructions for controlling the at least one processor when executed by the at least one processor such that the one or more communication servers are operative with the software instructions and configured to; communicate, via one or more communication networks, between a secured server and a plurality of remote devices to facilitate a secured service to the plurality of remote devices, the secured server and plurality of communication devices respectively coupled for communications with the communication system; receive a communication of a detection of a threat of a security breach in association with at least one of the plurality of remote devices; determine a potential level of risk and exposure to vulnerability in relation to the threat; determine potential remote devices at risk from the plurality of remote devices by identifying common risk factors between the first remote device and the others of the plurality of remote devices relative to threat; and initiate lockdown procedures for the potential remote devices.

The communication of a detection of a threat may be received from one of i) a first remote device of the plurality of remote devices and ii) a threat detection device.

The at least one security layer component may be configured to receive characterizing data for the threat of the security breach with which to determine the potential level of risk and exposure to vulnerability.

The at least one security layer component may be configured to receive a lock down communication from the at least one remote communication server to communicate a lock down instruction to at least some of the potential remote devices at risk. The lock down communication may be associated with data identifying the at least some of the potential remote devices at risk to facilitate communication of the lock down instruction. The at least one security layer component may be configured to: receive lockdown status communications from respective ones of the at least some of the potential remote devices at risk and communicate lockdown status information to the at least one remote communication server: and receive respective quarantine, messages from the at least one remote communication server to quarantine respective ones of the at least some of the potential remote devices at risk.

In any of the aspects described herein the secured services may be financial services. In any of the system and/or computing device (e.g. a server, a security layer component and remote devices, etc.) related aspects described herein, comparable computer-implemented methods and non-transitory computer storage device aspects are disclosed and vice versa.

Additional, objects and advantages of the disclosed embodiments will be set forth in part in the description that follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

Reference will now be made in detail to embodiments of the present disclosure, examples of which are illustrated in the accompanying drawings. Wherever possible, the same reference numbers will be used throughout the drawings to refer to the same or like parts.

In using a platform wide security infrastructure, highly sensitive financial or other applications may inherit a distributed level of protection by enabling server side security propagation. Secured services are provided via a remote client-side application executing on a remote device and communicating using a secured connection to a centralized server that serves multiple remote devices. Each application is identified by user specific credentials and at least one device specific identifier (e.g. IMEI, MAC address, application identifier, etc). Hostile attacks are monitored both at the remote device end and the server end. Upon detection of a suspicious access for example, the server can verify that the remote device has the appropriate remote device identifier and, if the device specific identifier is wrong or the application signature is wrong or both are wrong, lock down the remote application to ensure proper identification. Furthermore, upon detection of a hostile attack at the device end, and upon determination that this hostile attack has the potential of affecting other remote devices running this application on its network, the server may send out a lock out to all other vulnerable remote devices running this application preventing the spread of harmful functions in its network.

A lockdown confirmation may be used to determine the length and severity of the lock down based on the application update to a security layer, preventing propagation of the hostile functions and allowing for the quarantine of offending remote devices. It will be understood that under quarantine, there is a locking down of the application running on the remote device, not the remote device itself. When a lockdown confirmation is sent to the application, a length of the lockdown may be determined by the estimated time a clean version of the code can be loaded into the device or the length of time required to traverse the entire network to determine the breadth of the attack. Furthermore, the severity of the lockdown may be classified by levels where a level is determined by the number of functions being shut down compared to the total available functions to the end user.

Risk factors associated with the malicious code can also be tracked (e.g. via location based services (LBS) systems or others, where the prevalence of a risk may be localized to geography, communication network proximity (ping latency), and social network graph node proximity. Therefore the system may trigger a lockdown based on the proximity of an affected device. That is, although the servers or device may initially detect an attack or other inappropriate behaviour from one remote device, the servers may use various techniques to identify other potentially (or actually) threatening remote devices and pro-actively lock down these devices. The additional potentially threatening remote devices may be grouped based on risk factors such as membership in a same ad hoc network, similar geographic location, same/similar communication network proximity, and other factors relating users of the devices such as social network graph node proximity showing a close relation of the users. Ping latency may be evaluated between two devices or between the respective devices and the security layer. If the latency across the network between two end point devices (e.g. remote devices) is less than the latency between either one of the end point devices to the secured server, then the device with the lower latency to the secured server may initiate the shut down to the other end point device having the greater latency to the secured server to lessen or prevent the spread of a hostile function.

The lockdown may proceed in a tiered fashion where devices in near proximity may receive a more severe security measure than a device located in a further region of the physical distance, communication network or social graph. As will be understood, to prevent the spread of the hostile code (attack), and depending on the vector of attack one of physical distance, network distance, or social graph distance may determine the next victim (device to lock down).

A visualization of the affected devices may be presented by providing an overlay of the affected and/or lockdown devices over the complete network or social graph.

The instructions on the security measure may take one or ore paths and methods from email, network messages, or social network events.

FIG. 1 depicts an exemplary computing environment 100 consistent with the disclosed embodiments. Computing environment 100 may include one or more secured servers 102, one, or more remote communication servers 104, one or more security layers (e.g. a security layer 106), a remote device A (108) and one or more other remote devices 110. Also shown is a threat detection device 107, which may be optional as described further below.

It will be understood that environment 100 is simplified and many additional components of an environment (e.g. other servers, databases, networks and related infrastructure (including but not limited to firewalls, routers, switches, access points, antennae, etc.) are omitted. For example, environment 100 may include one or more communication networks (not shown). The communication networks may represent any type of network or medium of digital communication for transmitting information between computing devices. For example, a communication network may include a LAN, a wireless LAN (e.g., a WiFi network), a cellular network, a GSM network, a satellite network, an RF network, a Near Field Communication (NEC) network, a wireless Metropolitan Area Network (MAN) connecting multiple wireless LANs, NEC communication link(s), any physical wired connection (e.g., via an I/O port), and a WAN (e.g., the Internet).

It will be appreciated that though mobile devices are shown, smartphones, tablets, and laptops may be included. Devices 108, 110 are ones that connect via a module on the memory of the device that is used to connect the device to the remote communication server. Each of the one or more communication networks may include any accessible network or networks interconnected via, one or more communication protocols, including hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Some of the networks may be one or more wireless device networks, such as a GSM network or a PCS network, allowing devices (e.g., remote device A 108, etc.) to send and receive data (messages, signals, etc.) via applicable communications protocols.

In the example, secured servers 102 are operated by or on behalf of a financial institution (FI) (not shown) to provide services such as banking services via remote communication servers 104 to remote devices 108 and 110 for the benefit of users (not shown), being clients of the FI. The secured servers 102 may be configured via software to provide sewer-side applications (not shown) and databases (not shown) to provide the banking services. The secured servers 102 may interface with other servers (not shown) such as email servers or other communication servers (e.g. for SMS text, MMS, instant message, social network events/messages and/or voice communication, etc.) to communicate with the remote devices "out of band". "Out of band" here means in a different manner than the secured servers 102 communicate to provide the secure banking services to a client application on such remote devices (108, 110) via the security layer (106).

The remote communication servers 104 provide an interface to the banking services to remote device users and may also be configured such as via software. The remote communication servers are chiefly responsible for communications between the secured servers and respective remote devices (108, 110), to client side applications providing the banking services. Remote communication servers 104 may comprise mobile servers which provide communication services between network side servers (typically communicated over wired networks) to mobile devices, embedded devices, etc. that communicate wirelessly.

The remote communication servers 104 and remote devices (108, 110) communicate via secured layer 106 as described further below for providing the secure services. Remote communication servers 104 may also be configured to communicate with other servers to communicate with remote devices out of band as described. Each of the remote devices may be configured (such as via software) to provide a client-side application (not shown), whether native or browser based, etc. for conducting and/or receiving banking services with the FI (e.g. via a first communication band). Though banking services and a financial institution are described, other services (e.g. health related services, insurance related services, government related services) and/or other service providing entities (medical, business, government, etc) are contemplated. The present example is representative of a service paradigm where secure (private) communications are required (e.g. for the mutual benefit of both the users and the service providing entity). It will be understood that the remote devices connect for the secured services via the application that is in distinction to how workstations connect in a master slave relationship to a remote computer. Other communication scenarios may also benefit from the teachings herein such as within an IoT environment.

The remote devices 108 and 110 are further configured to detect security breaches, hostile attacks, malware, phishing and other disruptive code and operations that affect the operation of the client application for the secured services, attempt to steal credentials and/or the communication with the secured servers 102 via security layer 106. Such further configuration may be provided through the client-side application itself or via a utility or other application (all not shown) on the remote device. Following detection, a report of a breach, attack, etc. with characterizing data for same is communicated to security layer 106. There are several methods of detection which may be used: e.g. signature based, heuristics-based, behavioral, Cloud-based, string scanning method, wildcard method, mismatches method, generic detection, etc. One or more or a combination of these known approaches may be used to detect an attack.

The remote devices 108 and 110 are configured with one or more other applications (not shown) such as various communication applications (e.g. email, phone, text, IM, social network, etc.) through which out, of band communications may be communicated vi a second communication band. Remote devices 108 and 110 are also typically configured with other applications (browsers, media players, photo/video app., games, personal information management such as calendar, contacts, etc) amongst others.

In the present environment, remote devices 108, 110 are generally independently owned, operated and/or controlled relative to the service providing entity, (e.g. the FI). That is, remote devices 108, 110 are not all corporate devices or all devices subscribing to the same network service provider where corporate or network group policies of such nature may be enforced. Such policies may limit users' autonomy to configure the devices or engage in certain kinds of communications. Such corporate or other devices sharing particular characteristics may present a group of devices to which group messages may be easily communicated. Remote devices may comprise many different types, operating systems, versions, etc. Remote devices 108, 110 are relatively independent and heterogeneous. The service providing entity is unable to control how a remote device is generally configured other than in relation to the client-application for the secured service and any associated security detection function. Users, relative to the service providing entity, have a high degree of autonomy to configure and use the remote devices, for example, by downloading and installing additional software, etc. Such additional software may be intentionally or unintentionally installed and executed. Such additional software may compromise the security of the communications between the remote devices (108, 110) and secured servers (102) and/or any of remote communication servers 104 and security layer 106. Such additional software or configurations may be malware or other software, etc. designed to compromise such communications or engage in communications not permitted by the service providing entity.

A remote device (108, 110) may include any computing, data transmitting, data receiving, or data processing device consistent with the disclosed embodiments. A remote device (108, 110) may include any device capable of providing and receiving information over a communication network, for example, a smartphone, a tablet computer, a notebook computer, a hand-held computer, a personal digital assistant, a mobile phone, a wearable device (e.g., a smart watch), an embedded device, and any additional or alternate device capable of receiving or providing information to remote communication servers 104.

In one example, security layer 106 may be configured as a local system through which one or more remote devices communicate with remote communication server 104. The one or more devices connecting in such a manner may form or be joined in an ad-hoc or local network. This set of remote devices may be identifiable to the remote communication servers 104 and secured servers 102. Communications from the secured servers 102 and/or remote communication servers 104 may be communicated to each of the set devices in the ad hoc or local network such as described further below. In another example, security layer 106 may be configured as a cloud-based component (e.g. a remotely located network-based component). The one or more devices connecting via such a cloud-based component may form or be joined in an ad-hoc network as described. It will be understood that only one security layer is shown but more than one may be provided in environment 100. Remote devices may switch between different security layer instances (e.g. as a remote device is physically moved or in other manners (e.g. via selective or automatic choice)). Remote devices then may be members of different ad hoc networks as different times.

Figure 6:
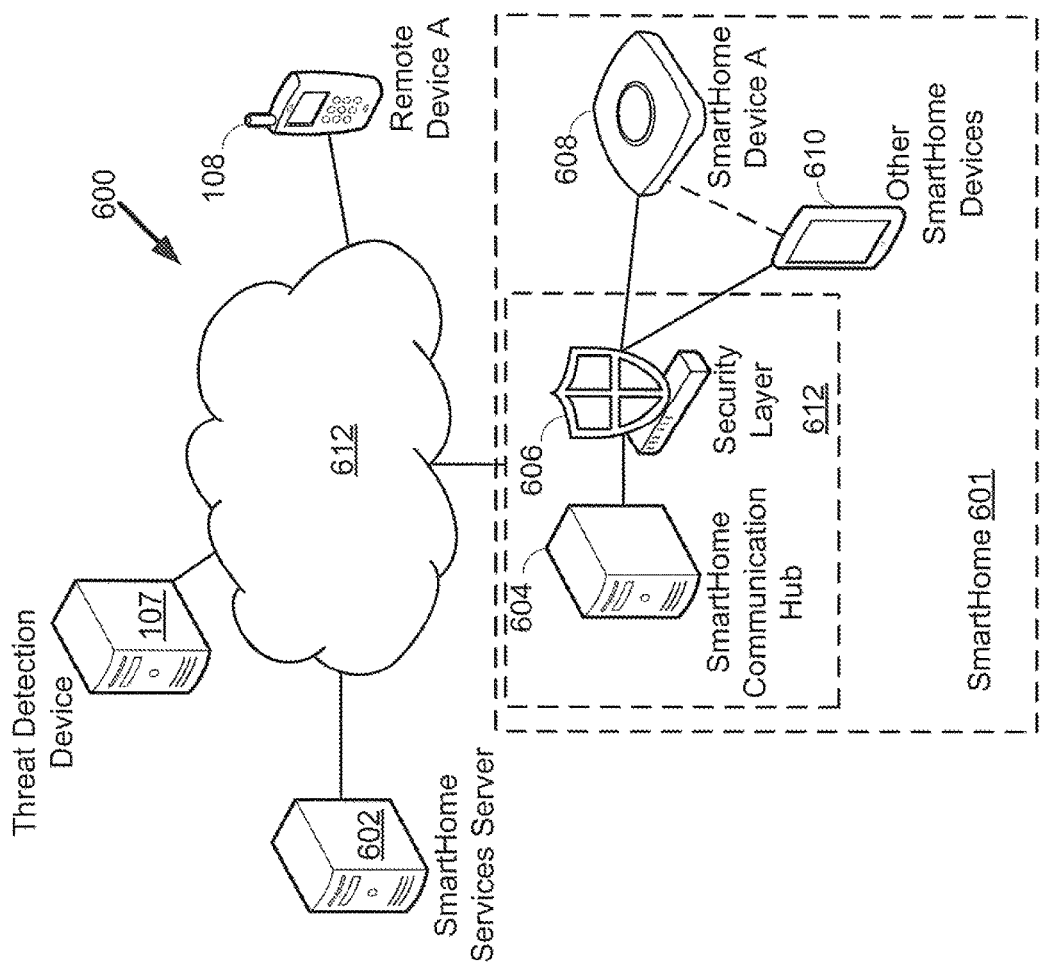
FIGS. 6 and 7 depict further exemplary computing environments consistent with disclosed embodiments.

In the example where the security layer may sit on a local system, one use scenario may be a connected smart home/home automation system, where connected devices in the home communicate with each other and a local central controller or a central hub, providing the security layer 106 (See FIG. 6 described further). For remote devices that connect through a network portal to a controller in the cloud, the security layer 106 may reside at the cloud server (See FIG. 7 described further). A plurality of such servers may sit adjacent one another providing respective security layers. An individual server providing the security layer 106 may be configured to communicate with only like types/sets of connected remote devices.

For local system based security layer, upon detection of a malicious attack on one device in the local network, the central controller or central hub may initiate a shutdown of other connected systems within the home. The propagation of the shutdown can be determined by a function of similarities in code or vulnerability. The process to shut down the connection of the connected device could be a simple command sent to the device with a pre-determined shut down code, which may shut down the device entirely, one or a set of functions running on the device, and/or specific network protocols of the device. The security layer in the local system may receive instructions from a remote communication server but it may also provide a second layer of security when a local system exists.

For a security layer in the cloud system, the shut down procedures may propagate through the cloud based architecture to all potential connected devices that may be affected by the malicious entity. The network distance as mentioned above may be calculated, determining the distance from the controller that first detects the security breach. This may help to contain a security breach to a limited set of connected devices. Security layer 106 may receive communications regarding detected threats from a system (e.g. a server or other computing device) which is not, strictly speaking, in the communication environment of the secured services between secured server 102 and remote devices 108, 110. FIG. 1 depicts threat detection device 107 as such a system. By way of example, the threat detection device 107 may: 1) provide a service from a third party, which monitors and advises of attacks and vulnerabilities whether real or potential, to remote devices 108, 110; 2) be a security layer type system for a different secured service (not shown), or 3) be a system from a remote device originator and/or a remote device component originator (e.g. manufacturer or seller of remote devices or their components including software (e.g. an operating system, etc.) within the environment of FIG. 1), which system monitors and advises of attacks and vulnerabilities whether real or potential to the remote devices or their components. As such, a security layer 106 may receive communications regarding the detection of various threats from one or more of a mobile device (e.g. 108) and a threat detection device (107).

Figure 2:
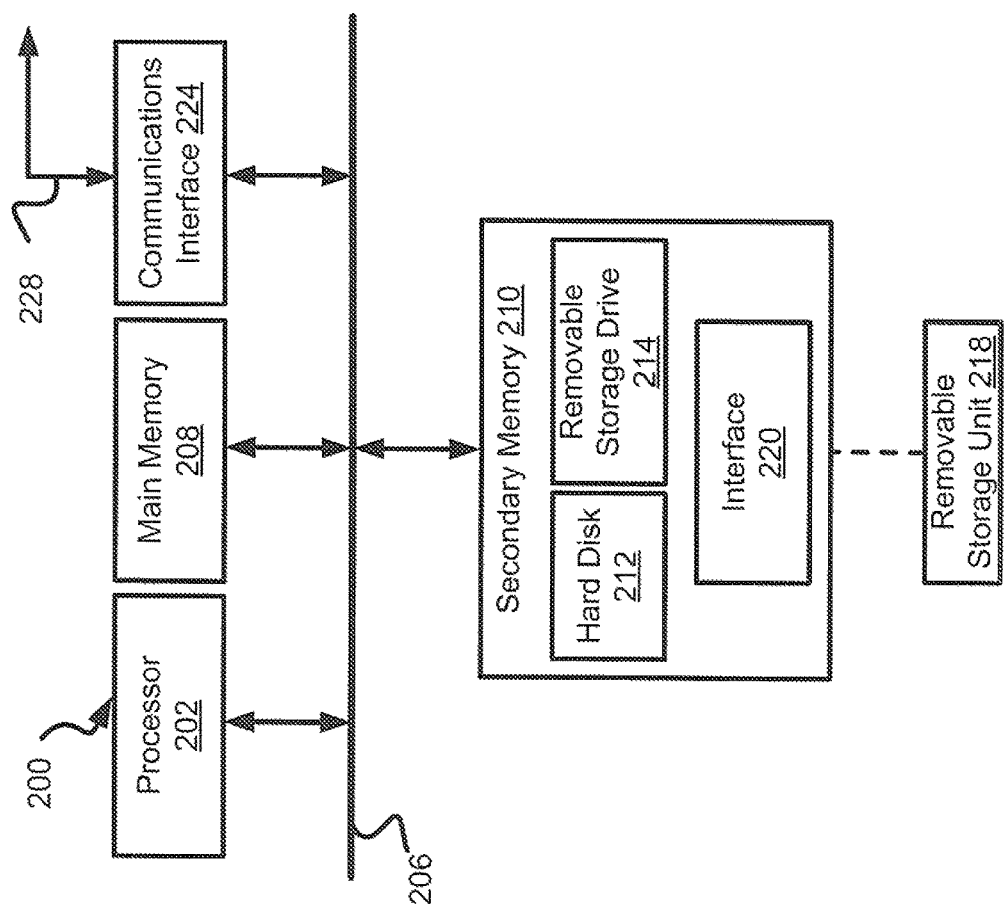
FIG. 2 depicts an exemplary computing system consistent with the disclosed embodiments.

FIG. 2 depicts a block diagram of exemplary computer system 200 with which certain aspects consistent with the disclosed embodiments may be implemented. For example, in some aspects, computer system 200 may reflect computer systems associated with a client device (e.g., remote device A 108), threat detection device 107, security layer 106, remote communication server 104, secured server 102 and the like. In some embodiments, computer system 200 may include one or more processors 202 connected to a communications backbone 206 such as a bus or external communications network (e.g., any medium of digital data communication such as a LAN, MAN, WAN, cellular network, WiFi network, NFC link, Bluetooth, GSM network, PCS network, communication network 120, and any associated protocols such as HTTP, TCP/IP, RFID, etc.).

In certain aspects, computer system 200 may include main memory 208. Main memory 208 may comprise random access memory (RAM) representing a tangible and non-transitory computer-readable medium storing computer programs, sets of instructions, code, or data executed with processor 202. When executed by processor 202, such instructions, computer programs, etc., enable processor 202 to perform one or more processes or functions consistent with the disclosed embodiments. In some aspects, such instructions may include machine code (e.g., from a compiler) and/or files containing code that processor 202 may execute with an interpreter.

In some aspects, main memory 208 may also include or connect to a secondary memory 210. Secondary memory 210 may include a disk drive 212 (e.g., HDD, SSD), and/or a removable storage drive 214, such as a magnetic tape drive, flash memory, an optical disk drive, CD/DVD drive, or the like. The removable storage drive 214 may read from and/or write to a removable storage unit 218 in a manner known to the skilled artisan. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In other embodiments, secondary memory 210 may include other means for allowing computer programs or other program instructions (operating, system, applications, etc.) to be loaded into computer system 200. Such means may include, for example, another removable storage unit 218 or an, interface 220. An example of such means may include a removable memory chip (e.g., EPROM, RAM, ROM, DRAM, EEPROM, flash memory devices, or other volatile or nonvolatile memory devices) and associated socket, or other removable storage units 218 and interfaces 220, which allow instructions and data to be transferred from the removable storage unit 218 to computer system 200.

Computer system 200 may also include one or more communications interfaces 224. Communications interface 224 may allow software and data to be transferred between computer system 200 and external systems (e.g., in addition to backbone 206). Communications interface 224 may include a modem, a network interface (e.g., an Ethernet card), a communications port, a PCMCIA slot and card, etc. Communications interface 224 may transfer software and data in the form of signals, which may be electronic, electromagnetic, optical or other signals capable of being received by communications interface 224. These signals may be provided to communications interface 224 via a communications path (i.e., channel 228). Channel 228 carries signals and may be implemented using wire, cable, fiber optics, RF link, and/or other communications channels. In one embodiment, the signals comprise data packets sent to processor 202. Information representing processed packets may also be sent in the form of signals from processor 202 through communications path 228.

Additionally or alternatively, computer systems consistent with the disclosed embodiments may include one or more I/O interfaces and I/O devices and or be coupled via communication interface 224 with such I/O devices. I/O devices for receiving client input include but are not limited to a keyboard, touch screen, camera, microphone, biometric or other sensors, etc, A remote device (e.g. 108) may receive input actively such as when a user is intentionally using an I/O device to operate it or passively such as via a biometric sensor monitoring a biometric function of the user in a background manner.

In certain aspects, the computer-implemented methods described herein can be implemented on a single processor of a computer system, such as processor 202 of computer system 200. In other embodiments, these computer-implemented methods may be implemented using one or more processors within a single computer system and/or on one or more processors within separate computer systems in communication over a network.

In certain embodiments in connection with FIG. 2, the terms "storage device" and "storage medium" may refer to particular devices including, but not limited to, main memory 208, secondary memory 210, a hard disk installed in hard disk drive 212, and removable storage unit 218. Further, the term "computer-readable medium" may refer to devices including, but not limited to, a hard disk installed in hard disk drive 212, any combination of main memory 208 and secondary memory 210, and removable storage unit 218, which may respectively provide computer programs and/or sets of instructions to processor 202 of computer system 200. Such computer programs and sets of instructions can be stored within one or more computer-readable media. In certain aspects, computer programs and sets of instructions may also be received via communications interface 224 and stored on the one or more computer-readable media.

Not shown in FIG. 2 are I/O interfaces or I/O devices, which may be coupled to computer system 200, I/O devices may include keyboards, microphones, speakers, pointing devices, display screens, with our without touch input capabilities, biometric and other sensors to monitor user functions, position sensors (e.g. for general location, such as a GPS, and/or for relative position/orientation of the device locally such as using accelerometers and/or gyroscopes), etc.

Figure 3A:
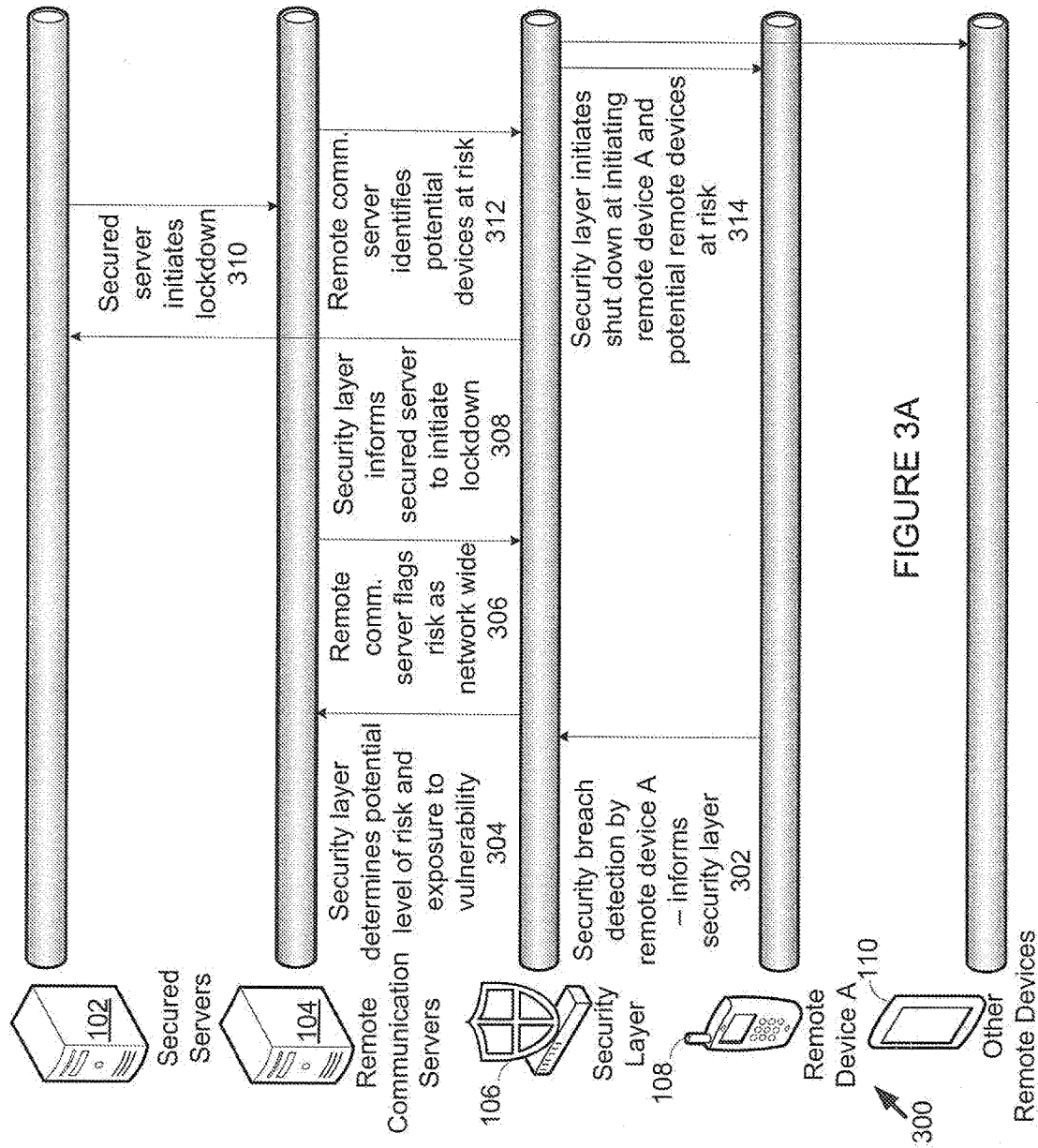
Figure 3B:
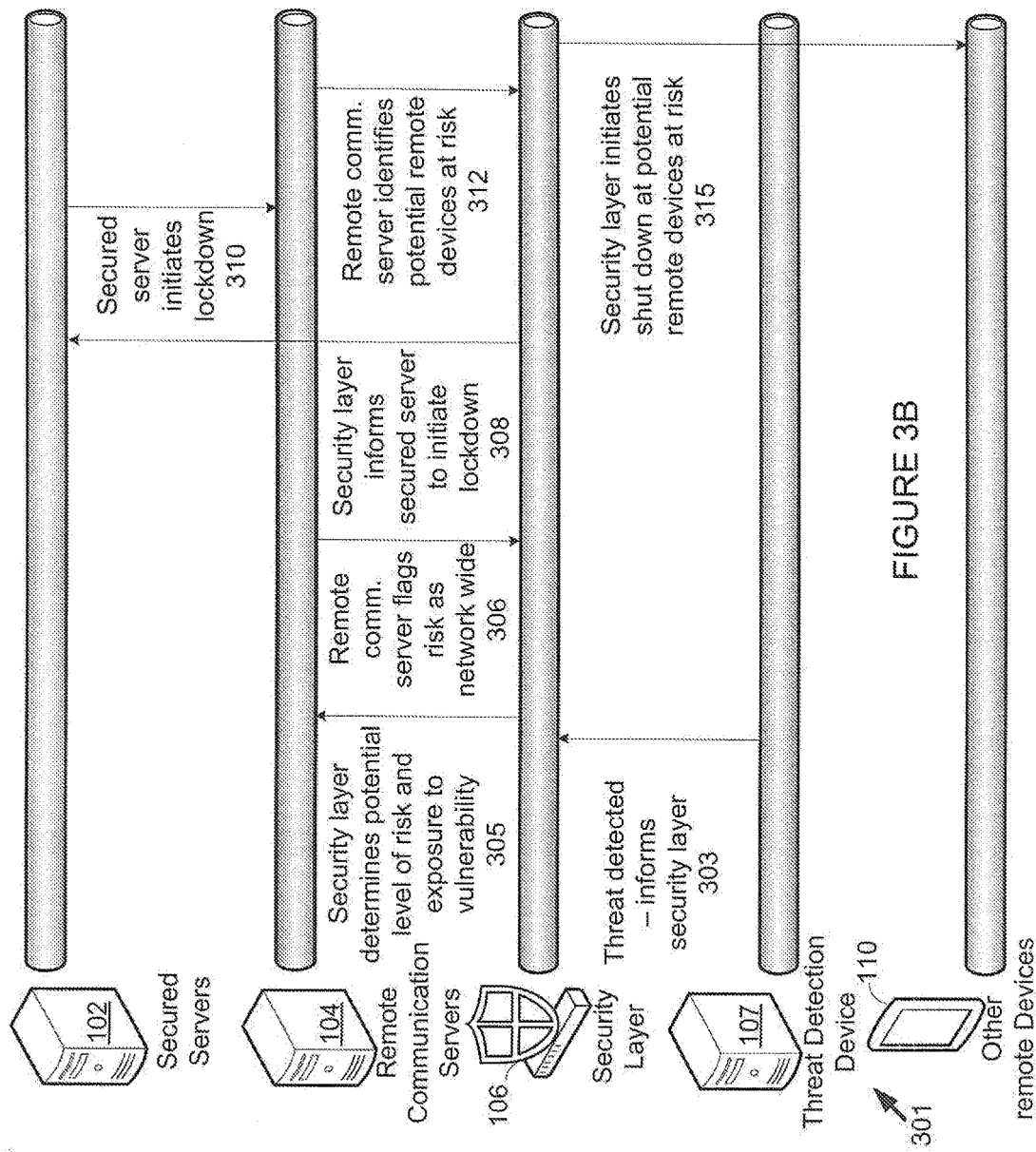

FIGS. 3A, 3B and 4 depict operations 300, 301 and 400 including flows of messages between components of environment 100. FIG. 3A represents a security breach detection via remote device 108 while FIG. 3B represents a threat detection via threat detection device 107.

With reference to FIG. 3A, at 302, a security breach detection is made by remote device A 108, which informs security layer 106 along with characterizing data. Security layer 106 determines a potential level of risk and exposure to vulnerability and communicates with remote communication servers 104 (at 304). The security layer 106 may track risks based on known penetration parameters. A disparity in process results, or a non-standard behavior may be a basis (trigger) for a scan of the output code. In one example a "smoke, test" could be executed to determine any abhorrent behavior of the application, which could lead to a scan of base code to determine if there is any malicious vulnerability. Once a breach is detected, a list of other devices on the network is analyzed to determine if there is any similar model/codebase/app versioning that could be used to determine if the other devices are vulnerable to the same attack.

A security breach may be detected at a device layer or a network layer. When detected, the type of breach, and information regarding the affected device is communicated. If more information regarding the attack vectors are known this is also communicated to the security layer (e.g. from a detecting device such as device A 108).

At 306, remote communication server 104 flags risk as network wide (for example), communicating with security layer 106. At 308, security layer 106 informs secured sewers 102 to initiate lockdown.

At 310, secured servers 102 initiate lockdown, communicating to remote communication servers 104. At 312, remote communication servers 104 identify potential remote devices at risk and communicate to respective security layers (e.g. 106). Remote communication servers 104 may use various risk factors and analysis to determine which devices to lockdown based on commonalities between remote device 108 (which detected the breach) and the other remote devices 110. For example, remote communication servers 104 may determine which devices to lock down by determining which devices communicate on a same security layer, which devices share similar configurations (e.g. operating system, application version, etc. vulnerable to the threat), which devices share certain relations such as determined by a proximity analysis of geographic location of the respective devices (e.g. by examining ping latency, network identification, location services data provided by the remote devices, IP address data, or other communication factors) and/or social network graphical analysis to find related users through social network data. A social network graph (or other data construct) may be constructed among users and/or remote devices using various social media or other relationships and/or upon analysis of digital social interaction between such users and/or remote devices. A social proximity measure may be determined from this data construct to relate users and/or devices that may be similarly at risk— e.g. at risk of sharing threats among one another as determined by analyzing the digital social interaction between individuals).

Upon determination that a network shut down is required, the system can be evaluated (e.g. by security layer 106 and/or remote communication servers 104) across each risk factor and a risk score can be assigned to each remote device associated with the network. A risk tolerance may be assigned by a known process that is determined by one or more of the following; the network administrator, risk scoring module, rules engine, or other risk evaluator; which can be used to shut down all remote devices with the application that has a risk score above the risk tolerance. In an alternative embodiment, the behavior of the user can be categorized into similar usage patterns which are used to determine the set of devices that needs to be shut down. Remote devices with users having similar usage patterns are likely to trigger similar functions on the application which may propagate the malicious code. For example, similar user usage patterns may be determined by defining, maintaining and reviewing an interaction model of individual users. A process count of available functions may be determined and each process count is then modeled to determine the intent of the user, and a pattern matching algorithm is used to determine similar usage patterns.

Alternatively or in addition, remote communication servers 104 may maintain or have access to data comprising lists (or other structures) of related devices (e.g. multiple remote devices of a single user, devices of related family members, etc.) with which to determine the potential devices at risk by association with the detecting remote device to lock down.

If details of the nature of the attack or breach are determinable, such information may indicate that only specific device types are vulnerable (e.g. those running a particular version of the client-side application, those running a certain operating system, etc.). The risk, factors and analysis may be combined to determine the potential devices at risk (e.g. lock down OS type X in geographic region Y).

At 314, security layer 106 initiates, shut down at initiating remote device A and other remote devices 110. For example, lock down may be a (coded) message to the client application to initiate a stop of the client application function(s). Lock down may be an out of band message to the user to take action to stop the client application. A lock down may prevent use of certain functions while a shut down or a quarantine may prevent the use of the application as a whole.

FIG. 3B illustrates a flow 301 for communication (at 303) of a detection of a threat from threat detection device 107. The threat is associated with at least one of the remote devices and represents a real or potential security breach to the secured services or the components thereof. The communication may include information pertaining to the threat such as a threat type, and characteristics of remote devices that are vulnerable to the threat (e.g. some shared characteristics or commonalities).

Security layer 106 determines a potential level of risk and exposure to the perceived vulnerability (at 305). Generally flows 306 to 312 are similar to those described with reference to FIG. 3B, it being understood that the threat is not detected by a first remote device but by an external system such that any of the plurality of remote devices 108-110 may be vulnerable and require lock down. While the threat communication may include characterizing data concerning the threat such as to identify that the potential threat is restricted to devices of a certain type (e.g., those running a specific operating system and version thereof), further risk assessment may be performed to evaluate the potential threat, for example, to widen the lockdown to additional remote devices (e.g. with a view to slow the sharing of offending code, viruses, etc. between proximate devices). At 315, communication is made with the potential remote devices at risk.

With reference to operations 400 of FIG. 4, remote devices 108 and 110 respond with lockdown status at 402. Security layer 106 updates remote communication servers 104 and secured servers 102 with list of compliant remote devices and a status update at 404.

At 406, secured server 102 updates remote device records with any status changes. Remote communication servers 104 request offending remote devices be quarantined at 408.

At 410, a quarantine message is sent to a remote device based on unique account and device identifiers.

At 412 a verification/confirmation and instructions request is sent to request devices to provide status/confirmation of quarantine.

Once a set of devices are shut down/quarantined/network connection severed, there exists a network with a number of non-connected nodes (e.g. nodes no longer capable/authorized to communicate for services of server 102). A reactivation message may be sent in a variety of manners including "out of band" (e.g. email/SMS/other with a secure code) as noted to re-enable the devices for the secured services. The reactivation message may trigger a reconfiguration of the first remote device to establish a new connection and/or avoid the security breach such as via a patch or reinstallation of a new version of the application.

In other manners, a "keep alive" type status message may be communicated while a device is quarantined which requires a remote device response showing OS, application software and other information to determine a state of the respective remote device. The information comprises patch/version information to determine whether the device is properly configured to avoid at least the previously detected threat and resume communications for services of server 102. A sending of the reactivation message (e.g. out of band) to a particular remote device may be responsive to this status information. The status information may be received by security layer 106 and any updates (changes to particular status information) may communicated to the other server to maintain lists of compliant devices. This status information may also be useful to determine device type information for risk assessment and be provided regularly during normal communications (i.e. when the remote device is not quarantined) to assist with the determination about whether to lock down or quarantine a device when a threat is detected.

For example, reactivation can be initiated by any of the following:

1. An out of band communication can be sent to a device (e.g. via email/SMS/other) with a secure code generated by the secured servers 102 to authorize a new connection to be initiated by the device. This may be performed upon resolution of the threat or creation and distribution of a patch that closes the vulnerabilities. The sending of the reactivation may be responsive to a status message response from the remote device indicating the device has been configured to avoid the previously detected threat.

2. The security shut down may only affect the communication to the set of secured servers 102 and may still allow for the client side application to maintain communication with an announcement server (not shown) which could be used to provide a real time status of the shut down to the customer. And once the issue is resolved an automated reactivation method can be sent directly to the client side application including recovery instructions securely coded to be decrypted by the client side application.

3. A deletion and new installation of the client side application may be required to reconnect the remote device to the network, where the client side application in the marketplace (e.g. servers providing for application distribution) is updated with the security fixes.

Remote communication server 104, as the primary network side component configured to manage communication with the devices, is responsible for sending the instructions for the restart. To determine whether to send a reactivation message to a particular remote device from those quarantined, a determination may be made as to the current configuration of the device. Remote communication server 104 may communicate a keep alive or status request message to device A 108 (and respective other quarantined devices) to receive a reply indicating the currency of the devices operating code (e.g. OS version and patch level), device software (similar information) to update tables maintained for all devices with which remote communication server 104 communicates. Similar information may be provide when devices are initially activated for communication and thereafter during "normal" communications (e.g. when not quarantined) to keep such information current. This information may be used to categorize the respective remote devices 108 and 110 for risk assessment analysis, whereby devices with similar software, etc. are likely to share similar risks for vulnerabilities. For example, until a particular patch/update to an OS or to other device software is reported by a quarantined device, a reactivation message may not be sent. In other embodiments, a message may be sent (e.g. out of band) to perform a fix for enabling reactivation.

Figure 5:
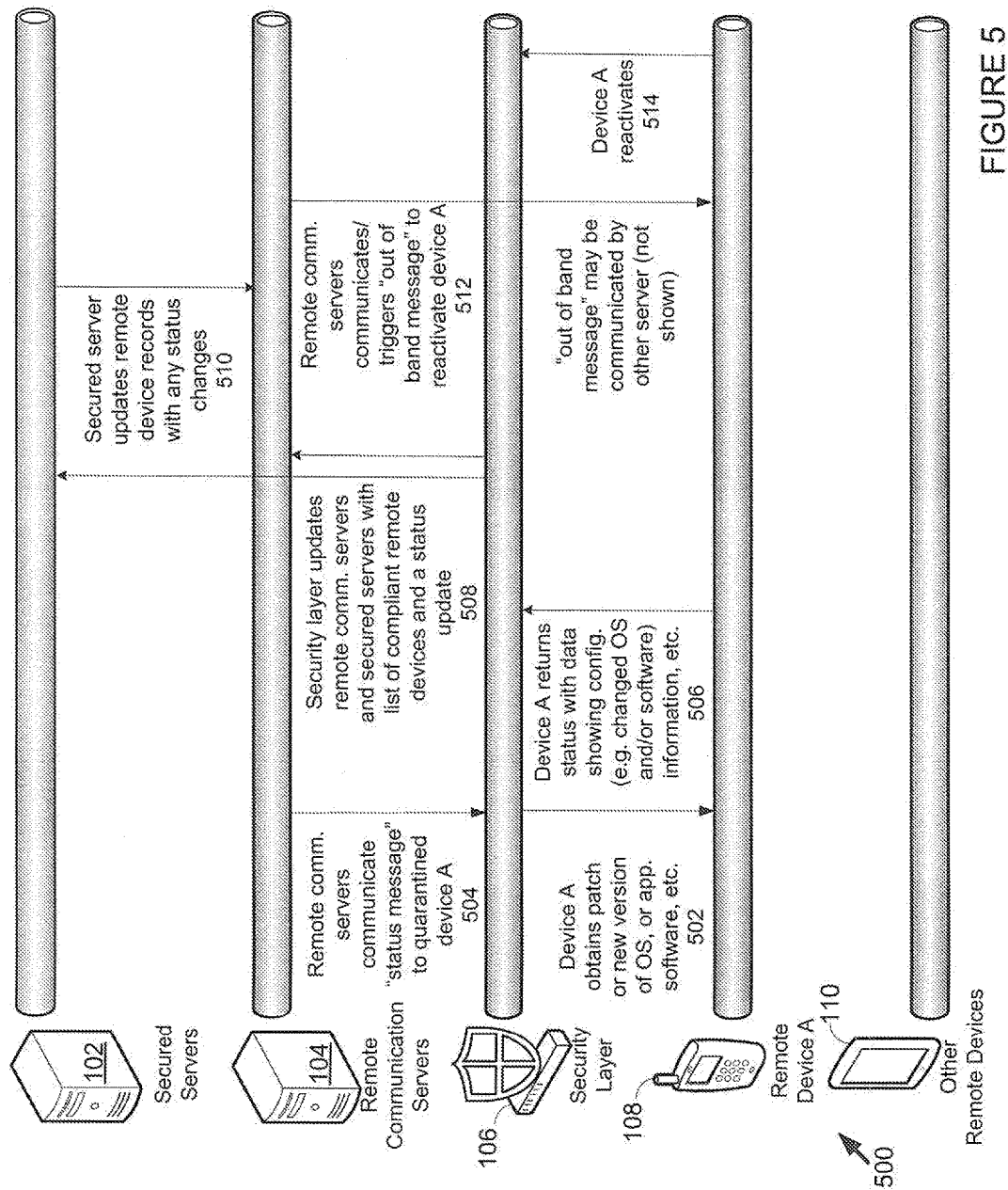
FIG. 5 depicts reactivation related operations including flows of messages or signals between components of the computing environment of FIG. 1 consistent with the disclosed embodiments.

FIG. 5 illustrates one exemplary embodiment of reactivation. At 502, remote device A, presently quarantined, performs an update to its configuration, for example, updating its OS, application software, etc. In one example, the update may delete and install a software application for communicating for services from server 102. The update is sufficient to address the previously detected threat and device A 108 is appropriately configured for communication for the secure service. It is understood that other credentials, permissions etc. may still need to be fulfilled. E.g. is a username and password correct, etc.

At 504, remote communication server 104 initiates a status message to device A (via security layer 106) to receive device status information concerning OS and software application version, patch numbers, etc. The message in reply (506) from device A to security layer 106 comprises a change to previous information in view of activity 502. At 508, security layer 106 updates remote communication servers 104 and secured server 102 with a status update (e.g. a list of compliant remote devices). At 510 secured server 102 may update remote device records and reply.

At 512, remote communication server 104 initiates an out of band message (e.g. with a secure code) to a quarantined device (e.g. Device A 108). The reactivation message may be responsive to an evaluation of whether a quarantined device is updated (e.g. responsive to a change in a device status list) such that it is configured for communication for the secure services. Though remote communication server 104 is shown as directly communicating to Device A 108 in FIG. 5, it is understood that the out of band message may be triggered by remote communication server 104 but communicated via a separate communication server such as an email server, SMS server or other server (all not shown). At 514, device A reactivates (which may comprise receiving an invocation of a (secure) link in an out of band communication received at device 108, etc.). Though not shown, security layer 106 may update status information in response to the reactivation as, may the other servers 102 and 104. Though not shown, remote device A 108 then communicates for the secured services.

Remote devices which have been locked down (e.g. short of quarantined) may be reactivated in a similar manner such as by sending an out-of-band reactivation message to a respective remote device via a second communication band. The locking down of the remote device may be removed in response to a reactivation by the respective remote device to permit the remote device to communicate for the secured service. Remote devices which are locked down may send status or other messages to remote communication server 104 via security layer 106 with configuration information. Such configuration information may be maintained by remote communication server 104 and/or security layer 106 for risk evaluation purposes and/or reactivation purposes. Such configuration information may indicate that a particular remote device is configured for communicating for the secure services (e.g. that the device is no longer vulnerable to a threat such as the threat detection in association with the device).

Some threat vulnerabilities may be server-side oriented whereby a fix to remove the vulnerability may require changes only to server-side components (e.g. software, etc.) No change or update to a remote device may be necessary. Remote communication server 104 may communicate a reactivation message to respective remote devices following such change or changes to the server side components. Remote communication server 104 may receive a communication (not shown) for example from secure server 102 or another server that indicates that reactivation in respect of a particular threat may be initiated. Remote communication server 104 may be configured or invoked from configuration data or other input to perform such a reactivation. Remote communication server 104 may also determine whether to reactivate any particular first remote device in such a scenario by evaluating configuration information maintained for that remote device which indicates the first remote device is configured to communicate for the secured service.

Though FIGS. 1-5 are described with reference to providing secured services to remote devices 108 and 110 depicted as mobile devices and personal client devices in a B2C setting, it is understood that the remote devices could be servers or other devices in a B2B or similar setting.

Variations in the Computing Environment

The security system disclosed herein may be employed to connected devices where a set of connected devices may be joined in an ad-hoc or local network, or connected through a cloud based network and the security layer may sit at either a local system or a cloud system such as described below.

Security Layer at a Local System

FIG. 6 depicts a simplified smarthome computing environment 600 in accordance with an embodiment. In this example, security layer 606 may reside (be deployed) on a local computer system such as one located at a connected smart home (e.g. a residence represented by broken line box 601), where connected devices in the home (e.g. 608 and 610) are communicating with each other and a central controller or a central smarthome communication hub 604 (an example of a server). A smarthome services server 102 may provide certain services via the hub 604, as protected by security layer 606, and communicate via network 612. The role of hub 604 is similar to remote communication server 104 as previously described. Security layer 606 may also have a similar role to security layer 106 as previously described. Security layer 606 and central hub 604 may be configured on a same (single) computing device (represented by broken line box 612) or on separate devices.

Remote Device A 108 (or other devices not shown) may be located within or without of the smarthome 601 and may communicate with smarthome devices 608 and 610, e.g. via the security layer 606, central hub 604 end server 602.

Upon detection of a malicious attack on one device (e.g. smarthome device A 608) in the local network, the security layer 606 and central controller or central hub 604 initiate a shut down (lock down) of other connected systems or selected features thereof (e.g. one or more of devices 610)) within the home network in a similar manner as shown in FIG. 3A. The propagation of the shut down to other smarthome devices (e.g. 610) can be determined by a function of similarities in code or vulnerability in the other smarthome devices 610 in comparison to device A 608 as previously described. Lock down may also extend to remote devices 108 which are associated with the central hub 604, for example, connecting remotely for controlling or communicating with devices 608, 610. In some examples, a threat detection may be communicated from an external device (i.e. external to the local network of the smarthome 601) such as by a threat detection device 107 and operate in a similar manner to FIG. 3B, The process to shut down the connection of the connected device (e.g. 608) could be a simple command sent to the device 608 with a pre-determine shut down code which may shut down the device 608 entirely, one or a set of functions running on the device 608, and/or specific network protocols of the device 608. Quarantining (deactivation) and reactivation may be similar to the operations described in respect of FIGS. 4 and 5. Though not shown, central hub 604 and/or security layer 604 may follow a reporting protocol to alert other components (e.g. threat detection server 107 or other components not shown) of the threat detection to assist with protection of server 102.

Security in the Cloud System

Figure 7:
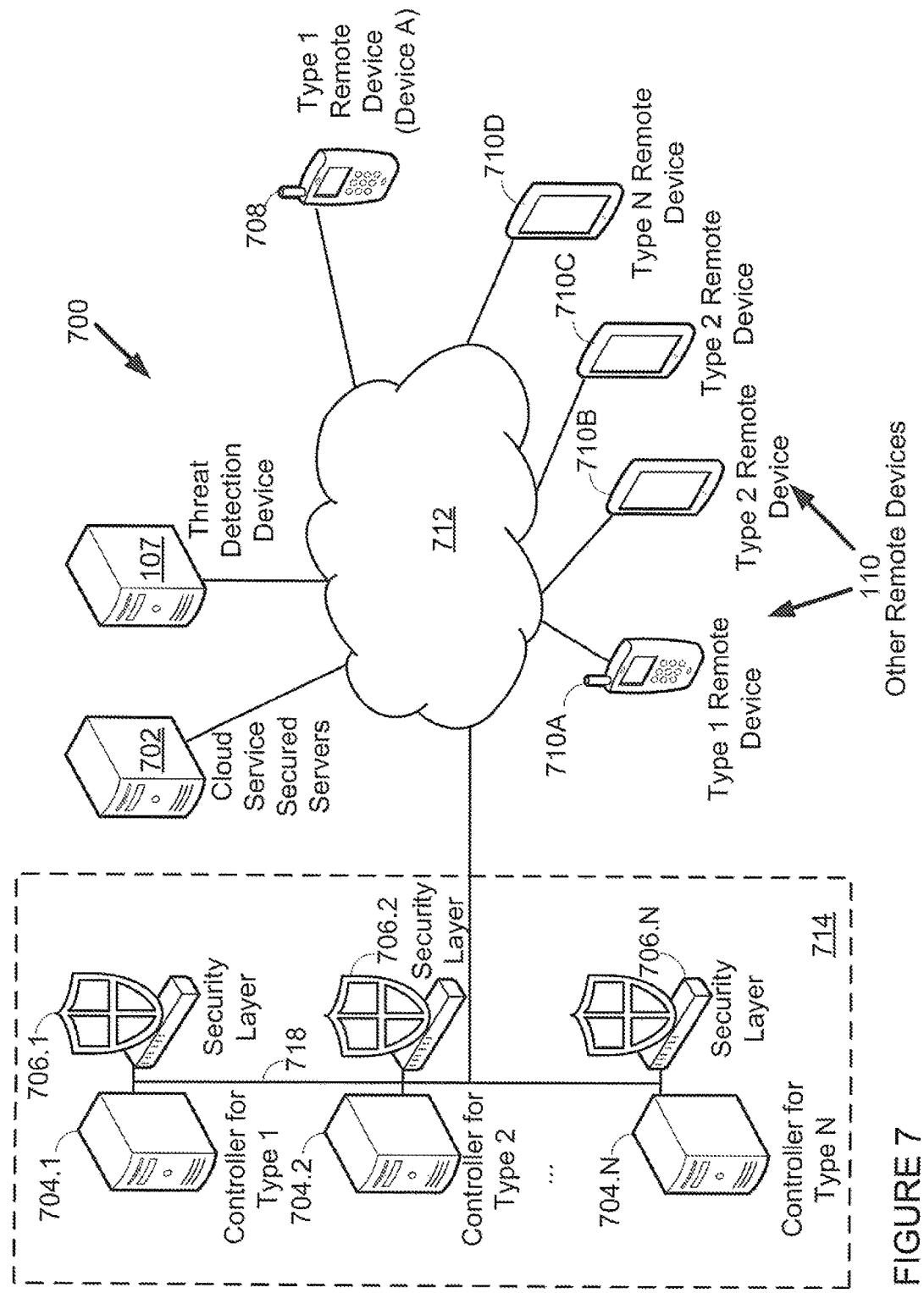

FIG. 7 depicts another environment 700, such as a cloud-based environment, where a secured server in the cloud (e.g. cloud service secured server 702) provides a service via a network (e.g. 712) to a plurality of respective remote computing devices (708, 710A, 710B, 710C and 710D). Each of the computing devices has a respective type (e.g. Type 1, Type 2, . . . Type N) such that respective devices of a same type communicate for a service of server 702 via a respective network controller 704.1, 704.2 . . . 704.N for each of the 1 . . . N different types. Same type herein generally means devices with a same operating system (or operating system family) but may be more granular (e.g. hardware manufacturer, application/version, etc.). Respective security layers 706.1, 706.2, . . . 706.N provide security services and sit adjacent to the multiple controllers (704.1, 704.2 . . . 704.N). It will be appreciated that server 702 is similar to server 102, security layers 706.1, 706.2 . . . 706.N are similar to, security layer 106 and respective controllers 704.1, 704.2 . . . 704.N are similar to remote communication server 104 all as previously described.

Each of the security layers 706.1, 706.2 . . . 706.N may be connected for communication with one another. The N controllers and N security layers may be connected via a LAN (e.g. 718) and be provided by a single services provider (which may be an enterprise or third party services provider) from a commonly managed location as represented by broken line box 714. Though only one such group of controllers and security layers are shown, more than one may be in service to provide cloud services of server 702 or similar servers (also not shown) to remote communication devices.

A detection of a security breach and/or assessment of risk by one security layer may be propagated to the other security layers. A security layer may be a threat detection device for other security layers within a same group or even to other security layers (not shown).

Any shut down (e.g. locking down and/or quarantining) may propagate through the cloud-based architecture to all potential connected devices that may be affected by the malicious entity/attack. Remote device type (e.g. Type 1, 2, N) may be determined and evaluated as noted herein above to assess risk and determine devices, one or a set of functions running on the devices, and/or specific network protocols of the devices to shut down. Shut down may be staged, selecting the order of devices to shut down among all potentially vulnerable devices and/or shut down may be limited to fewer than all potentially limited devices. As noted previously, a network distance as mentioned herein above may be calculated, in this instance, to be a distance from the controller that first detects the security breach. Those devices with similar distances may share similar risks. This may help to contain a security breach to a limited set of connected devices.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

For example, a blacklist of locked down or quarantined devices may be maintained by the network components (e.g. remote communication server 104 or other component). This list may be used (e.g. by secured server 102) to prevent processing of messages from blacklisted remote devices (messages may be identified by respective remote device unique Ds in the messages). A greylist that contains remote devices that are identified as being at risk but have not been infected may also be maintained. Processing of information and messages from these devices may be performed differently. By way of example, greylisting may be used to allow for a device to have the ability to verify account balances, but having any transfer/payment functions disabled. This is would be a different way of processing both inputs and messaging to that greylisted device. There may be other methods whereby the device requires user authentication for any sensitive processes to occur.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A communication server, comprising:
   a storage device; and
   at least one processor coupled to the storage device, the storage device storing software instructions to configure the operation of the at least one processor, which when executed is configured to:
   communicate, via one or more communication networks, between at least one secured server and a plurality of remote devices, including a first remote device, to facilitate a secured service to the plurality of remote devices from the at least one secured server, wherein communications between the communication server and the first remote device are communicated through a first security layer component and communications between the communication server and others of the plurality of remote devices are communicated either through the first security layer component or at least one other security layer component; wherein the communications providing the secured service between the secured server and the plurality of remote devices comprise an in-band communication; and
   following a locking down or quarantining of the first remote device in which in-band communications by the first remote device for the secure service are at least limited:
   communicate a reactivation message to the first remote device which comprises an out of band communication; and
   remove the locking down or quarantining of the first remote device in response to a reactivation by the first remote device to permit the first remote device to communicate for the secured service limited by the locking down or quarantining,
   wherein the locking down or quarantining of the first remote device was responsive to a detection of a threat in relation to the first remote device and wherein a configuration information maintained for the first remote device indicates the first remote device is no longer vulnerable to the threat.

2. The communication server of claim 1 wherein the communication server is operative to determine whether to reactivate the first remote device by evaluating configuration information maintained for the first remote device which indicates the first remote device is configured to communicate for the secured service.

3. The communication server of claim 1 operative to communicate to the first remote device an in-band communication comprising a status inquiry message to initiate a response that communicates configuration information from the first remote device.

4. The communication server of claim 3 operative to maintain configuration information for the first remote device in accordance with the response.

5. The communication, server of claim 1 wherein the reactivation message is communicated via email, SMS, MMS, instant messenger, voice or other protocol different from a protocol used to communicate in-band communications.

6. The communication server of claim 1 wherein the reactivation message comprises a secure link, which, when invoked, initiates reactivation of the first remote device to the communication server.

7. The communication server of claim 1 wherein the first security layer component and the communication server are implemented by a single computing device.

8. The communication server of claim 1 wherein the secured service is a financial service.

9. A computer-implemented method, comprising:
   communicating, by at least one processor of a communication server, between at least one secured server and a plurality of remote devices, including a first remote device, to facilitate a secured service to the plurality of remote devices from the secured server via one or more communication networks, wherein communications between the communication server and the first remote device are communicated through a first security layer component and communications between the communication server and others of the plurality of remote devices are communicated either through the first security layer component or at least one other security layer component; and wherein the communications providing the secured service between the secured server and the plurality of remote devices comprise an in-band communication;
   following a locking down or quarantining of the first remote device in which in-band communications by the first remote device for the secure service are at least limited:
   communicating a reactivation message to the first remote device via an out of band communication; and
   removing the locking down or quarantining of the first remote device in response to a reactivation by the first remote device to permit the first remote device to communicate for the secured service limited by the locking down or quarantining; and
   wherein the locking down or quarantining of the first remote device was responsive to a detection of a threat in relation to the first remote device and wherein a configuration information maintained for the first remote device indicates the first remote device is no longer vulnerable to the threat.

10. The method of claim 9 comprising determining whether to reactivate the first remote device by evaluating configuration information maintained for the first remote device which indicates the first remote device is configured to communicate for the secured service.

11. The method of claim 9 comprising communicating to the first remote device an in-band communication comprising a status inquiry message to initiate a response that communicates configuration information from the first remote device.

12. The method of claim 11 comprising maintaining configuration information for the first remote device in accordance with the response.

13. The method of claim 9 wherein the reactivation message is communicated via email, SMS, MMS, instant messenger, voice or other protocol different from a protocol used to communicate in band communications.

14. The method of claim 9 wherein the reactivation message comprises a secure link, which, when invoked, initiates reactivation of the first remote device to the system.

15. The method of to claim 9 wherein the secured service is a financial service.

16. A system for securely communicating a secured service to a plurality of remote communication devices, the system comprising:

a plurality of remote communication servers and respective security layer components, each of the remote communication servers comprising:
a storage device; and
at least one processor coupled to the storage device, the storage device storing software instructions which when executed configures a respective one of the remote communication servers to:
communicate, between at least one secured server and some of the plurality of remote devices to facilitate a secured service to the some of the plurality of remote devices via one or more communication networks, wherein communications between the respective one of the remote communication servers and the some of the plurality of remote devices are communicated through the respective security layer component; wherein communications facilitating the secured service comprise in band communications; and
following a locking down or quarantining of a first remote device of the some of the plurality of remote devices, in which in-band communications by the first remote device for the secure service are at least limited:
communicate an out-of-band reactivation message to the first remote device via a second communications band; and
remove the locking down or quarantining of the first remote device in response to a reactivation by the first remote device to permit the first remote device to communicate for the secured service limited by the locking down or quarantining,
wherein the locking down or quarantining of the first remote device was responsive to a detection of a threat in relation to the first remote device and wherein a configuration information maintained for the first remote device indicates the first remote device is no longer vulnerable to the threat.

17. The system of claim 16 wherein each remote device of the plurality of remote devices comprises one of a plurality of N different device types and wherein the plurality of remote communication servers comprises N remote communication servers each communicating with one of the plurality of N different device types.

18. The system of claim 16 wherein each of the remote communication servers is configured to determine whether to reactivate a particular remote device by evaluating configuration information maintained for the particular remote device which indicates the particular remote device is configured to communicate for the secured service; and wherein the particular remote device communicates configuration information during a period of the locking down and/or quarantining.

* * * * *